US008887217B2

(12) United States Patent
Salem et al.

(10) Patent No.: US 8,887,217 B2
(45) Date of Patent: Nov. 11, 2014

(54) SYSTEMS AND METHODS FOR QUALITY OF EXPERIENCE AWARE JOINT SCHEDULING OF BUFFERED VIDEO ON DEMAND AND BEST EFFORT FLOWS

(71) Applicant: FutureWei Technologies, Inc., Plano, TX (US)

(72) Inventors: Mohamed Salem, Ottawa (CA); Jianglei Ma, Ottawa (CA); Petar Djukic, Ottawa (CA)

(73) Assignee: FutureWei Technologies, Inc., Plano, TX (US)

( * ) Notice: Subject to any disclaimer, the term of this patent is extended or adjusted under 35 U.S.C. 154(b) by 23 days.

(21) Appl. No.: 13/802,099

(22) Filed: Mar. 13, 2013

(65) Prior Publication Data

US 2014/0282769 A1 Sep. 18, 2014

(51) Int. Cl.
 *H04N 7/173* (2011.01)
 *H04N 21/234* (2011.01)
(52) U.S. Cl.
 CPC .............................. *H04N 21/23406* (2013.01)
 USPC .................... 725/94; 725/87; 725/92; 725/93
(58) Field of Classification Search
 USPC ............................................... 725/87, 92–94
 See application file for complete search history.

(56) References Cited

U.S. PATENT DOCUMENTS

| 7,826,371 B2 * | 11/2010 | Hirayama et al. ......... 370/236.1 |
| 2004/0085978 A1 | 5/2004 | Bly et al. |
| 2004/0179542 A1 | 9/2004 | Murakami et al. |
| 2008/0225838 A1 | 9/2008 | Vesma et al. |
| 2009/0129302 A1 | 5/2009 | Pekonen et al. |
| 2010/0262712 A1 * | 10/2010 | Kim et al. ...................... 709/231 |
| 2010/0333148 A1 * | 12/2010 | Musha et al. .................... 725/81 |
| 2013/0198314 A1 * | 8/2013 | Quere et al. ................... 709/213 |

FOREIGN PATENT DOCUMENTS

| CN | 101009657 A | 8/2007 |
| CN | 102858018 A | 1/2013 |

OTHER PUBLICATIONS

Singh, S. et al., "Video Capacity and QoE Enhancements over LTE," Communications (ICC) IEEE International Conference on, Jun. 10-15, 2012, pp. 7071-7076.
Sadiq, B. et al., "Downlink Scheduling for Multiclass Traffic in LTE," EURASIP Journal on Wireless Communications and Networking, vol. 2009, Article ID 510617, Feb. 16, 2009, 18 pages.

* cited by examiner

*Primary Examiner* — Mulugeta Mengesha
(74) *Attorney, Agent, or Firm* — Slater & Matsil, L.L.P.

(57) ABSTRACT

System and method embodiments for joint scheduling of buffered video on demand (VoD) and best effort flows within the same band enable improved quality of experience for VoD receiving mobile devices without resource partitioning or sacrificing FSS gains. In an embodiment, a method for scheduling video on demand flows and best effort flows within the same band includes determining with a transmission point (TP) a buffer vacancy for each of the ones of a plurality of mobile devices wirelessly coupled to a transmission point that are receiving VoD flows, calculating, with the TP, buffer vacancy scheduling weights for the plurality of mobile devices using the buffer vacancy, and determining, with the TP, a joint schedule of VoD flows and best effort flows based on the buffer vacancy scheduling weights.

31 Claims, 11 Drawing Sheets

SYSTEMS AND METHODS FOR QUALITY OF EXPERIENCE AWARE JOINT SCHEDULING OF BUFFERED VIDEO ON DEMAND AND BEST EFFORT FLOWS

TECHNICAL FIELD

The present invention relates to wireless transmission systems, and, in particular embodiments, to a system and method for scheduling buffered video on demand and best effort flows.

BACKGROUND

Video on demand (VoD) is a system in which users may select and watch videos according to their own time preferences (e.g., on demand). Many users currently make use of VoD at their desktop or laptop watching videos provided by various content providers via the Internet. However, as the capability of mobile wireless devices increases, users will increasingly use their mobile devices to view VoDs. It is projected that in the near future, VoD will constitute a major portion (e.g., greater than 70%) of mobile traffic.

In order to deliver video and other services (e.g., web pages) to mobile devices, the transmission point (TP) (e.g., a base station transceiver (BST)) may schedule various VoD flows and best effort flows (e.g., a mechanism for delivering other content such as web pages) to utilize the available transmission bandwidth. Some schedulers may use static partitioning of the bandwidth with separate schedulers for VoD flows and for best effort flows. Additionally, some schedulers utilize a regular proportional fairness (PF) utility plus a barrier function of the video playback buffer occupancy. Barrier functions impact the scheduling decisions only when the buffer occupancy is below a preset threshold, which may increase the fairness among user buffers as it increases and vice versa. Some of the schedulers further utilize an empirical weighting factor to scale the barrier function to impose fairness in terms of the total rebuffering time. Furthermore, these schedulers may also result in variations in quality across the system which may cause some users to have a poor quality of experience (QoE) when viewing videos on their wireless devices. Also, resource partitioning and scheduling VoD flows separately as provided by these schedules lacks flexibility to adjust to changing traffic conditions and compromises Frequency Selective Scheduling (FSS) gains. Rebuffering time may be the most critical attribute to a VoD user's QoE and service outage criteria are typically based on the percentage of total rebuffering time the user experiences. However, these schedulers may result in an inefficient use of bandwidth resources and provide a less than desirable QoE for the user.

SUMMARY OF THE INVENTION

In accordance with an embodiment, a method for scheduling video on demand flows and best effort flows within the same band includes determining with a transmission point (TP) a buffer vacancy for each of the ones of a plurality of mobile devices wirelessly coupled to a transmission point that are receiving VoD flows, calculating, with the TP, buffer vacancy scheduling weights for the plurality of mobile devices using the buffer vacancy, and determining, with the TP, a joint schedule of VoD flows and best effort flows based on the buffer vacancy scheduling weights.

In accordance with another embodiment, a network component configured for scheduling video on demand flows and best effort flows within the same band includes a processor and a computer readable storage medium storing programming for execution by the processor, the programming including instructions to determine a buffer vacancy for each of the ones of a plurality of mobile devices wirelessly coupled to a transmission point that are receiving video on demand (VoD) flows, calculate vacuum pressure scheduling weights for the plurality of mobile devices using the buffer vacancy; and determine a joint schedule of VoD flows and best effort flows based on the backpressure scheduling weights.

In accordance with yet another embodiment, a method for scheduling video on demand (VoD) flows and best effort flows within the same band includes determining, with a transmission point (TP), buffer vacancies for user equipment (UE) receiving VoD flows, obtaining, with the TP, a safe vacancy value range, and determining, with the TP, a joint schedule of VoD flows and best effort flows based on a vacuum pressure scheduling algorithm using the buffer vacancies, wherein best effort flows are allowed to compete with VoD flows when the buffer vacancies for the UEs receiving VoD flows are within the safe vacancy value range.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein is a system and method for opportunistic joint scheduling of buffered video on demand (VoD) and best effort flows in the same band from a transmission point (TP) or access point (AP). As used herein, the terms TP and AP may be used interchangeably. In an embodiment, wireless devices coupled to a TP (e.g., a base transceiver station (BST)) sends playback buffer vacancy information concerning the wireless devices' playback buffers to the transmission point enabling quality of experience (QoE) aware scheduling of VoD and best effort flows. The transmission point uses modified backpressure (e.g., vacuum pressure) dynamic control policies to jointly schedule VoD flows and best effort flows. The joint schedule may include a vacuum pressure schedule that uses backpressure control policies as applied to buffer vacancies on the UE side. Different feedback signaling mechanisms may be utilized to facilitate stabilizing the playback buffers taking into account the application/device physical storage capability.

In an embodiment, the TP executes a joint scheduling algorithm that calculates buffer vacancy weights for each of a plurality of VoD flows and allows best effort flows to compete for resources according to their traditional PF utilities if the VoD buffers are within a safe region. A user may initiate two or more different sessions simultaneously through the UE. One could be consuming a VoD flow while the other is consuming a best effort flow. IN such case, the scheduler assigns each flow its appropriate weight. A user may also initiate two or more different VoD flows simultaneously on the UE and watch one of the videos while the others are buffering. Each VoD flow is assigned appropriate weights separately. The safe region is determined or defined by an operator (also referred to as a wireless service provider) such that the requirements or desires of the operator are effectively implemented. Actual and/or virtual buffer vacancy calculations may be defined in terms of playback time units (PTUs), e.g., picture frames or time (e.g., number of seconds), with respect to a common reference buffer size, as an enabler for a modified backpressure scheduling (e.g., vacuum pressure scheduling). The system includes feedback signaling mechanisms for the wireless devices to report both playback buffer state and remaining physical memory for buffering to the media access control (MAC) layer of the TP. The ongoing buffer sate feedback may be contention based/random access. For example, absolute indication of or differential change (i.e., with respect to previous instances) buffer state feedback may be significant change-driven or can be even reduced to a pause/play-synchronization feedback if the TP can estimate the buffer states. The feedback may include an initial feedback of the "remaining physical buffer size in bytes" (RPhyB). The ongoing RPhyB feedback thereafter could be an event-based Boolean feedback whenever the RPhyB undershoots ('set') or overshoots ('reset') a given low level threshold, e.g., a specified percentage of the physical buffer size. In some embodiments, either of the contention based/random access feedback can be implemented in a wireless device specific periodic manner (e.g., configurable depending on the network load and the buffer state).

In contrast to the schedulers discussed above, the disclosed systems and methods provide for jointly scheduling best effort and VoD flows (also referred to as video flows) within the same band. Furthermore, the frequency selective scheduling (FSS) gain may be harnessed. FSS utilizes channel quality versus frequency in scheduling transmissions. The disclosed systems and methods also provide flexible scheduling with load variations. In some embodiments, a "control knob" is provided to an operator allowing the operator to decide (e.g., control) when best effort users may content for resources (e.g., radio resources). Furthermore, the disclosed systems and methods calculate scheduling weights for VoD flows using a modification of the well-established backpressure control theory rather than using empirical weights and parameters of barrier functions. The modified backpressure algorithm utilizes the buffer vacancy of each mobile device communicating with the TP to determine an associated vacuum pressure. Whereas the backpressure is an indication of how full a buffer is, the vacuum pressure is an indication of how empty a buffer is when a reference size is considered. The disclosed systems and methods substantially maximize playback buffer utilization on each mobile device. Maximizing the buffer utilization may result in a better QoE for the user since the mobile device may be less likely to empty the buffer during playback thereby mitigating the need to rebuffer the video stream and mitigating the probability that the user will experience pauses or other undesirable features in the playing of the video. Additionally, the disclosed systems and methods do not rely on a preset hard threshold for QoE driven response, but instead utilize a soft scheduler that is flexible with varying loading conditions.

Additionally, in an embodiment, the disclosed systems and methods provide efficient feedback mechanisms intended for the MAC layer of the TP. The buffer state feedback may be either significant change-driven/random access or periodic with wireless device specific configurations. If the buffer state can be estimated at the TP, feedback may be limited to only an event-based pause/play-synchronized Boolean to reduce traffic over the wireless link. Furthermore, the physical buffer size of the application/device may be taken into account via a dedicated Boolean feedback mechanism.

In an embodiment, the disclosed systems and methods may achieve a substantial increase in VoD user capacity as compared to other methods. In an embodiment, the disclosed systems and methods feature a soft scheduling policy that allows joint scheduling of best effort and VoD flows in the same band without sacrificing system resources or FSS gain. Additionally, the disclosed systems and methods provide operators with a simple "control knob" to decide when best effort flows may contend for resources.

Figure 1:
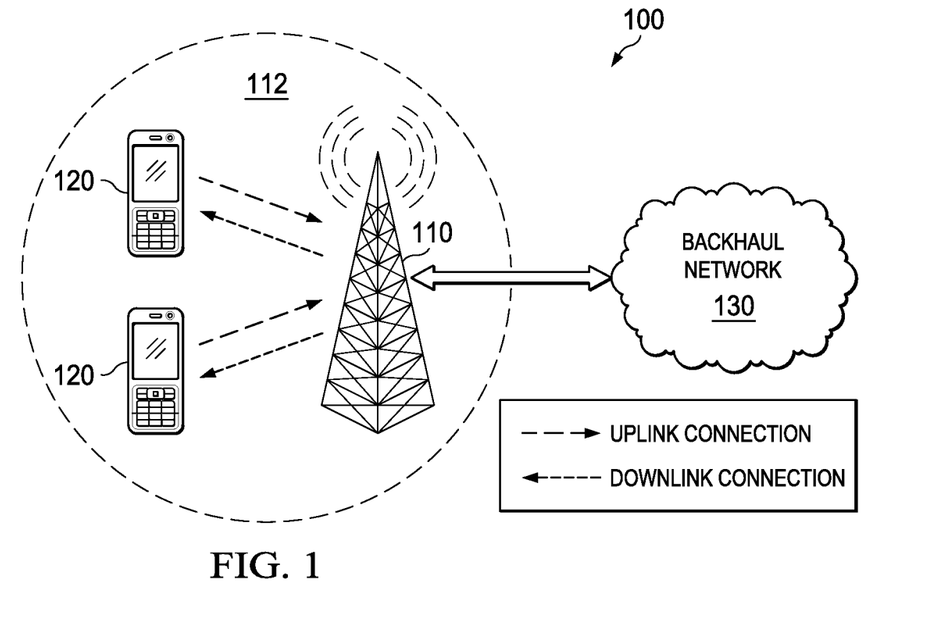
FIG. 1 illustrates a network for communicating data.

FIG. 1 illustrates a network 100 for communicating data. The network 100 comprises an access point (AP) 110 having a coverage area 112, a plurality of user equipment (UEs) 120, and a backhaul network 130. As used herein, the term AP may also be referred to as a TP and the two terms may be used interchangeably throughout this disclosure. The AP 110 may comprise any component capable of providing wireless access by, inter alia, establishing uplink (dashed line) and/or downlink (dotted line) connections with the UEs 120, such as a base station transceiver (BST), an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
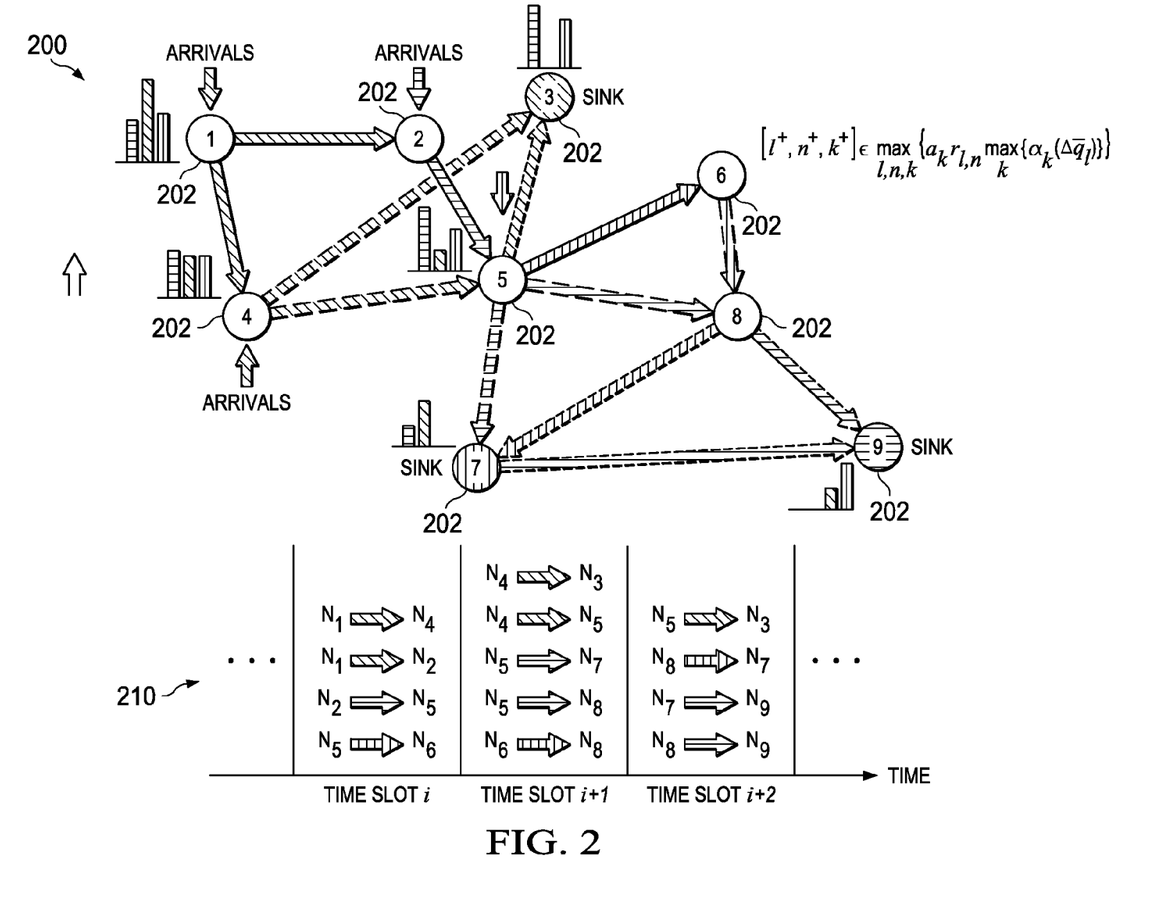
FIG. 2 is a schematic diagram illustrating a system for backpressure dynamic control policies.

FIG. 2 is a schematic diagram illustrating a system 200 for backpressure dynamic control policies. System 200 includes a plurality of nodes 202 coupled to each other as shown. Schedule 210 shows when each node 202 is scheduled to transmit data to another node 202. The nodes 202 are labeled 1, 2, 3, 4, 5, 6, 7, 8, and 9 and are denoted as $N_1$, $N_2$, $N_3$, $N_4$, $N_5$, $N_6$, $N_7$, $N_8$, and $N_9$ in the schedule 210. The solid lines indicate data flows from one node 202 to another node 202 at time slot i. The dashed lines indicate data flows from one node 202 to another node 202 at time slot i+1. The dotted lines indicate data flows from one node 202 to another node 202 at time slot i+2. During any time slot, transmission of data flows occur on orthogonal resources, i.e., in frequency, code, space, etc. Data arrives at source nodes 202 labeled 1, 2, and 4 and flows through the system 200 to sink nodes 202 labeled 3, 7, and 9. The schedule 210 is determined by a backpressure dynamic control policy (also referred to as backpressure routing) according to a backpressure algorithm. Backpressure control policies and algorithms are well known to those of ordinary skill in the art. Backpressure routing is an algorithm for dynamically routing traffic over a multi-hop network by using congestion gradients. The backpressure algorithm operates in slotted time. At every time slot, the backpressure algorithm seeks to route data and assign appropriate resources in directions associated with the maximum differential backlog between neighboring nodes. An example of a backpressure algorithm may be expressed as:

$$[l^*,n^*,k^*] \in \max_{l,n,k}\{a_k r_{l,n} \max_k\{a_k(\Delta \vec{q_l})\}\},$$

where l is the wireless link between a pair of nodes, n is the resource unit, i.e., frequency tone, spatial beam, or spreading code while k is the data flow, $a_k$ is the priority of the kth data flow, $r_{l,n}$ is the achievable transmission rate on link l using resource n, and $\Delta \vec{q_l}$ is the differential backlog (buffer occupancy) between the source and destination nodes of the l th node.

The backpressure dynamic control policies are queue and channel aware and may stabilize all user queues under the largest set of arrival rates. A backpressure dynamic control policy is agnostic to the statistics of exogenous arrival rates and link capacities. It attempts to assign the resources with the largest pipe sizes to the queues with the largest differential backlogs (backpressure). Backpressure dynamic control policies provide joint routing and scheduling and, within their stability region, no queue grows unbounded. The backpressure dynamic control policies achieve average delays that are independent of the number of flows.

Figure 3:
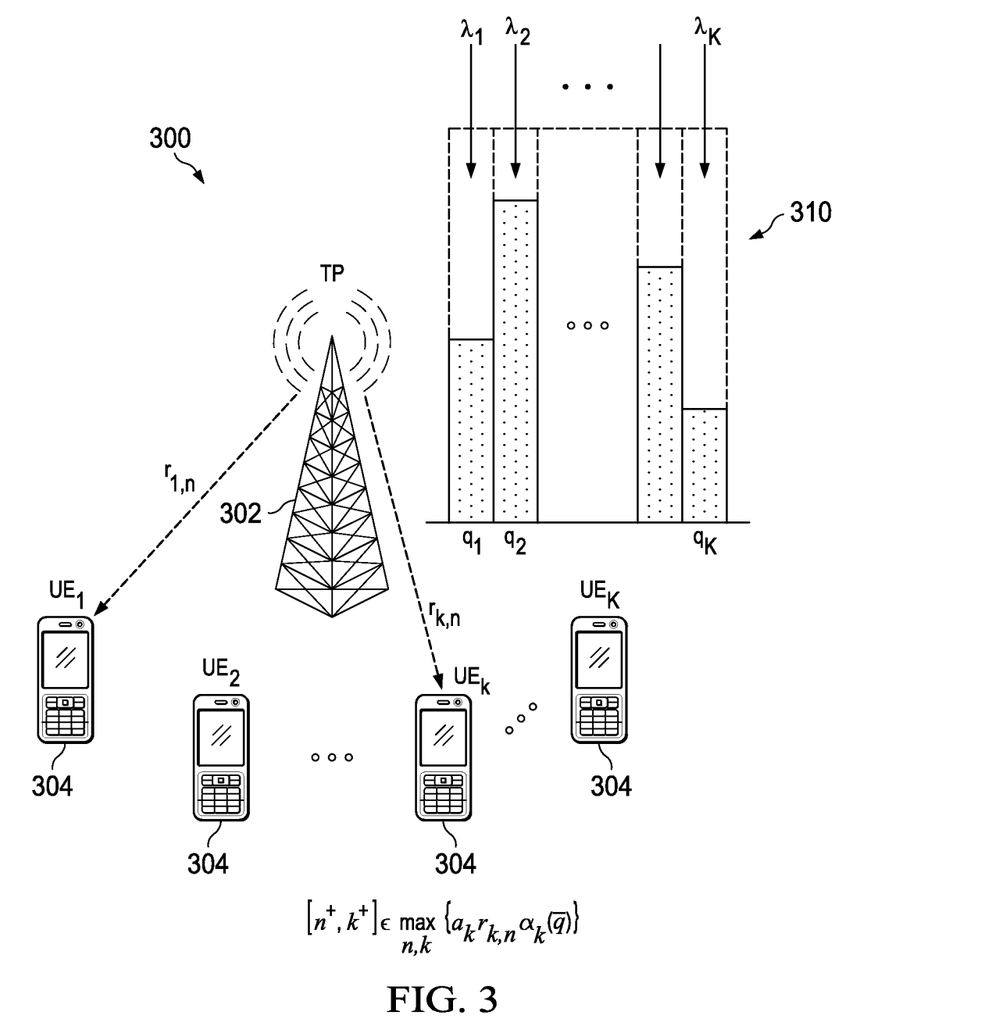
FIG. 3 illustrates a special case backpressure dynamic control wireless system.

FIG. 3 illustrates a special case backpressure dynamic control wireless system 300. The system 300 includes a TP 302 and a plurality of UEs 304. Each UE has a corresponding buffer 310 at the serving TP. The TP may act in a similar manner to the source nodes 202 in FIG. 2. The UEs 304 may act in a similar manner to sink nodes 202 in FIG. 2. However, directly applying the backpressure scheduling policy described in FIG. 2 to the VoD problem by replacing the buffer occupancies at the serving TP by the playback buffer states at the UEs' side would result in minimizing the playback buffer occupancies. This because in the VoD problem, maximizing the playback buffer occupancy is desired to mitigate rebuffering.

Figure 4:
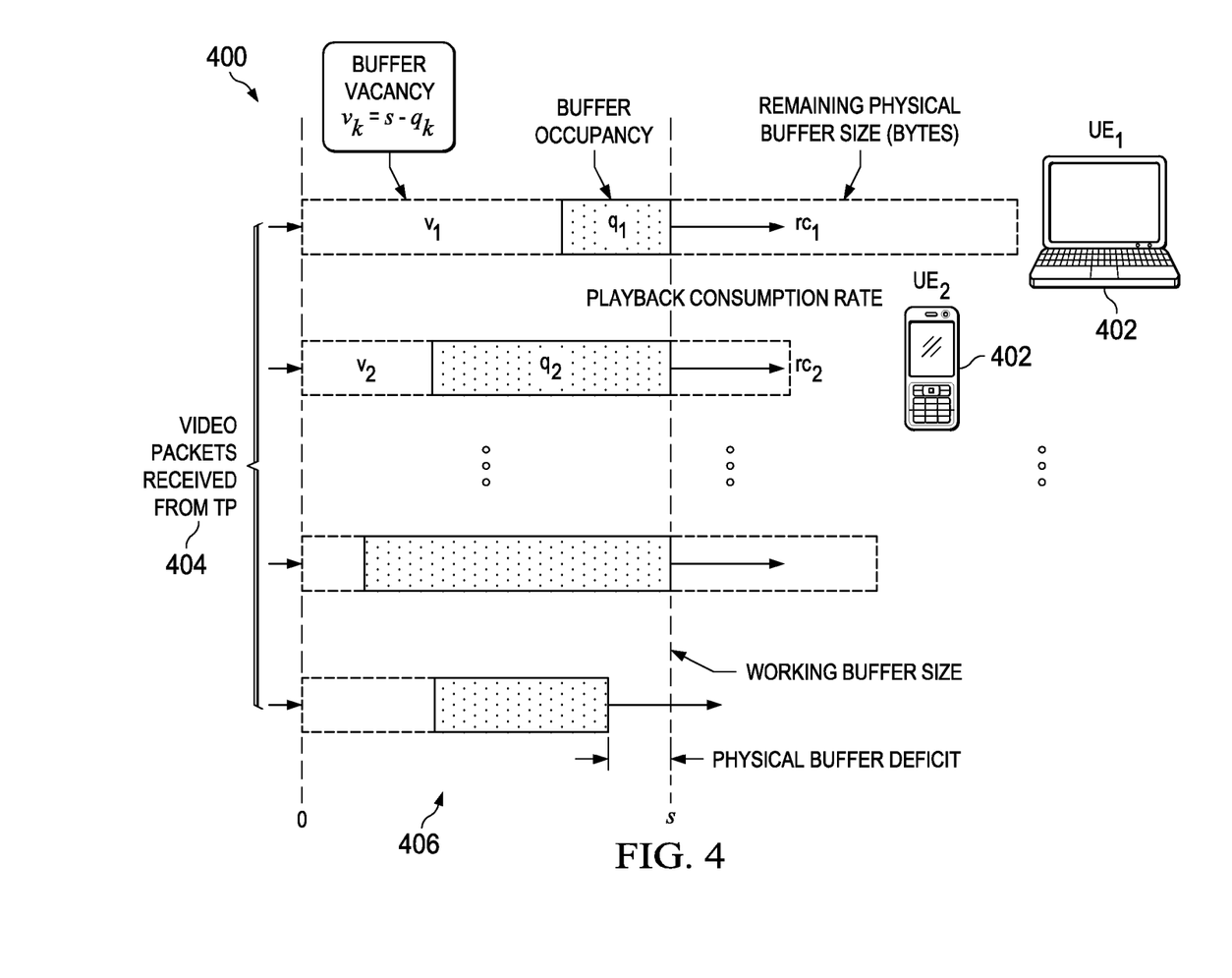
FIG. 4 illustrates an embodiment system for backpressure scheduling on buffer vacancies.

FIG. 4 illustrates an embodiment system 400 for backpressure scheduling on buffer vacancies. Backpressure scheduling on buffer vacancies may also be referred to as vacuum pressure scheduling. The system 400 includes a plurality of user equipment 402 and a plurality of video packets 404 received from a TP. Each UE 402 has a buffer 406 with a working buffer reference size. Each UE 402 also has a respective playback consumption rate denoted $rc_i$ a remaining physical buffer size where i indicates the UE 402. Thus, $rc_1$ is the video consumption rate for UE1 and $rc_2$ is the video consumption rate for UE2. The buffer occupancy in the working buffer for each UE 402 is $q_i$. The buffer vacancy for each UE 402 is $v_i$. The buffer vacancy for the $k^{th}$ UE 402 may be expressed as $v_k=s-q_k$. A video transmission schedule for the UEs 402 is computed such that the buffer vacancies are substantially minimized (i.e., substantially maximizing the buffer occupancy for each UE 402). Maximizing the buffer occupancy for each UE 402 diminishes the chance that the UE 402 will consume all for the video packets in its buffer 406 and have to re-buffer, thereby diminishing the quality of experience for the UE 402 user.

One objective of the system 400 is to stabilize and balance video playback buffers across all users using a modified backpressure (e.g., vacuum pressure) scheduling policy. In an embodiment, the backpressure scheduling policy such as described above with reference to FIG. 2 has the backpressure at the TP 402 replaced by the vacuum pressure at the UE 402. The buffer vacancies at the UE 402 are expressed in PTUs, such as picture frames, and are calculated using a reference buffer size, s. The largest buffer vacancies are assigned to the largest pipe sizes (i.e., resources with largest achievable rates). Outstanding buffer vacancies attract the highest scheduling priority. As a result of the balancing behavior, an Automatic rate boost may be provided for users just admitted to a video on demand (VoD) service with vacant buffers. Support for different quality and/or multiple representation video streams simultaneously is provided by system 400. Since video consumption rates in PTUs/sec are typically the same regardless of the video quality (e.g., 30 or 25 frames/sec), devices with a physical buffer size less than s cannot buffer as much video data and thus may need to be fed more often (i.e., get scheduled frequently before buffer is exhausted). Therefore, these devices may automatically be granted higher priority due to the persistent amount of buffer vacancy they possess.

Figure 5A:
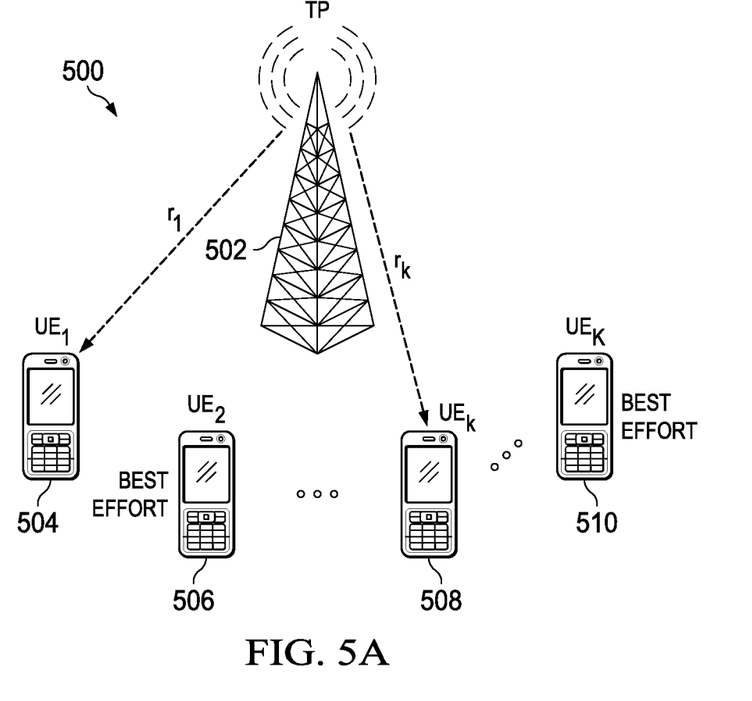
FIG. 5A illustrates an embodiment system for providing VoD and best effort flows to UEs.

FIG. 5A illustrates an embodiment system 500 for providing VoD and best effort flows to UEs. The system includes a TP 502 and a plurality of UEs 504, 506, 508, 510. Some of the UEs 504, 508 receive video streams from TP 502 and some of the UEs 506, 510 receive best effort data from the TP 502. Best effort data includes, for example, delivery of web pages, e-mail or other data for which the service agreement between a service provider and a user provides that the service provider deliver certain kinds of data as a best effort with no guaranteed data rate. The TP 502, or a system coupled to the TP 502 through a backhaul network such as backhaul network 130 shown in FIG. 1, jointly streams video to UEs 504, 508 and best effort flows to UEs 506, 510 using a modified vacuum pressure protocol to ensure that the buffers for the UEs 504, 508 are full or at least in a sufficiently full state to be in a safe zone (e.g., a safe vacancy range or a safe vacancy region) where the UE 504, 508 is unlikely to consume the buffer before additional data is received from the TP 502. In another embodiment, a user might initiate two or more different sessions simultaneously through its UE; some could be consuming VoD flows while others are consuming best effort flows. In such case, the scheduler assigns each flow its appropriate weight.

Figure 5B:
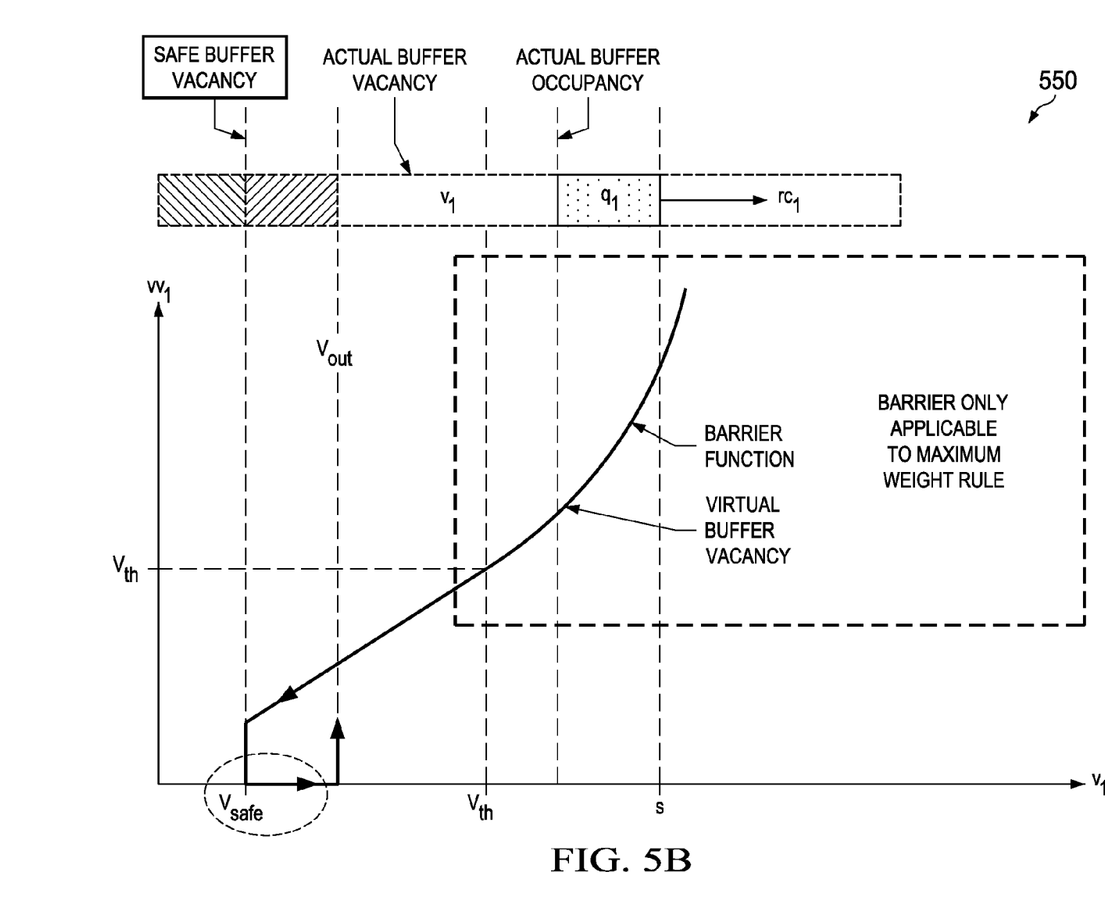
FIG. 5B is a graph illustrating an embodiment of safe vacancy range and barrier function (in case of max weight rule) for scheduling VoD and best effort flows for UEs in a system.

FIG. 5B is a graph illustrating an embodiment of a max weight rule (a less complex backpressure policy yet inferior to the exp rule) along with a possible barrier function for scheduling VoD and best effort flows for UEs in system 500. We note that the exp rule does not need a barrier function. Each UE 504, 506, 508, 510 has a video buffer with a safe buffer vacancy level, $v_{safe}$. When the buffer vacancy is less than the save buffer vacancy level, the buffer is not in danger of becoming empty soon. Therefore, other UEs may be scheduled as higher priorities. Exaggerating the large values of actual buffer vacancy and/or de-emphasizing the impact of low buffer vacancy values are termed 'virtual vacancy'. The latter component of virtual vacancy is the enabler for joint scheduling of VoD and best effort flows and is applied as an adjustment to the VoD vacuum pressure scheduling such that the priority of a video flow with buffer vacancy within the safe region (e.g., $<v_{safe}$), becomes less than the priority of best effort flows. In an embodiment, virtual vacancy is a mapping function of the actual vacancy. The virtual vacancy shows effect only at the extreme ends of the buffer vacancy and is relatively insensitive to changes in between. Since best effort flows would be temporarily rate deprived while some video buffers are being served before the safe region, $R_{ave}$ values of best effort flows will be decreasing and thus granting them higher priorities than a video flow once it enters the safe region.

Two techniques for enabling joint scheduling of VoD and best effort flows may be utilized. One technique specifies that when the buffer vacancy reaches the safe region as defined by $v_{safe}$, the virtual vacancy weight for that buffer is set to zero and held in the zero state within a hysteresis window of length W playback seconds. Another technique specifies that the virtual vacancy weight of a VoD is always normalized by its value computed at $v_{safe}$ such that VoD utility (vacancy $<v_{safe}$) ≤its regular PF utility. The first technique is somewhat artificial. The second technique is a 'soft technique' and has fewer parameters than the first technique, but has increased complexity in computing.

In an embodiment, a vacuum pressure policy implements exponential rules that emphasize vacancy-balancing at the cost of the sum weighted rate. These rules may provide superior performance to other rules such as maximum weight rules or log rules. If the system is only scheduling buffered VoDs, then the following equation is used:

$$[k^*_{EXP}, n^*_{EXP}] \in \max_{k \in K_v} \left\{ a_k r_{k,n} \exp\left( \frac{b_k vv_k}{c + \left(\frac{1}{|K_v|} \sum_k b_k vv_k\right)^\eta} \right) \right\}$$

$$a_k = 1/\overline{R}_k,$$

where $k^*_{EXP}$ is the selected VoD flow, $n^*_{EXP}$ is its assigned resource, $r_{k,n}$ is the achievable rate on the link to $UE_k$ on resource n, $\overline{R}_k$ is the average throughput of flow k, $b_k$ is the kth flow service differentiation weight of the generic definition of the exp rule, c is constant that prevents the division by zero and controls the sensitivity of the function to the root-mean term in the denominator, $vv_k$ is the virtual vacancy variable, $\eta$ is a positive exponent, and $K_v$ is the set of VoD flows considered at this scheduling instance.

Typical parameters that yield good performance are:

$$c = 1 \quad \eta \in \left[\frac{1}{2}, \frac{1}{3}\right] \quad b_k = 1 \quad \forall k \in K_v \quad s \in [3, 5] \text{ minutes}$$

For joint scheduling, the equalizing vacancy weight term is added as follows (This is the second soft technique, i.e., no hysteresis window is used):

$$[k^*_{EXP}, n^*_{EXP}] \in \max_{k \in K_v} \left\{ a_k r_{k,n} \exp\left( \frac{b_k vv_k}{c + \left(\frac{1}{|K_v|} \sum_k b_k vv_k\right)^\eta} - \frac{b_k v_{safe}}{c + \left(\frac{1}{|K_v|}\left(b_k v_{safe} + \sum_{j \neq k} b_j vv_j\right)\right)^\eta} \right) \right\}$$

Typical parameters that yield good performance are as stated earlier in addition to:

$$v_{safe} < s - 45 \text{ sec}, S \in [3, 5] \text{ minutes}.$$

Figure 6:
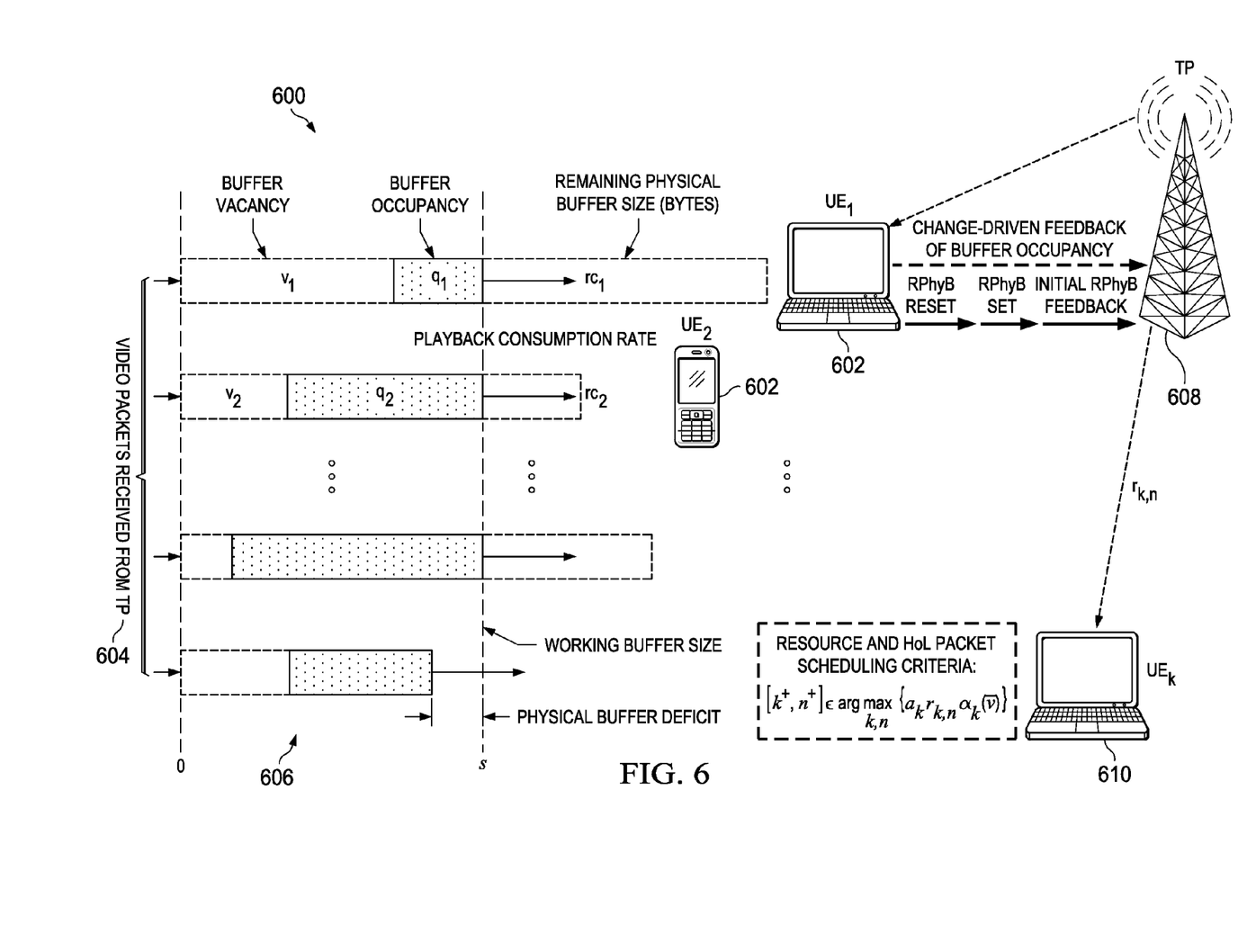
FIG. 6 illustrates an embodiment system for determining UEs' buffer states and remaining physical memories for buffering video data at the transmission point.

FIG. 6 illustrates an embodiment system 600 for determining the buffer states of the UEs 602. System 600 includes a TP 608 and a plurality of UEs 602. Each UE 602 receives video packets 604 from the TP 608 and each UE 602 has a respective video buffer 606. In embodiments in which the TP 608 is not aware of application level packets (e.g., frames), the UEs 602 may transmit their respective buffer states back to the TP 608. This feedback may be either absolute or differential. It could be implemented through random access or UE specific periodic access (depending on the network load and buffer state). If the TP 608 is aware of the application level packets, buffer state feedback is not required. For example, if the TP 608 is able to map the correctly received MAC packets to corresponding picture frames, the buffer state is estimated at the TP 608 side. However, an event-based single bit "pause/play-synch" synchronization feedback (e.g., playback feedback) may be provided by the UEs 602 to help the TP 608 in maintaining accurate estimates of the buffer states. Typically, buffer dynamics are slow compared to cell network dynamics.

In an embodiment, an initial feedback of the physical buffer size in bytes (PhyB) may be required at the beginning of the VoD session (e.g., how much memory is available for buffering on that application/device). However, the absolute feedback may be switched to an even-based single bit feedback whenever the remaining physical buffer size in bytes (RPhyB) undershoots (set) or overshoots (reset) a given low level threshold (e.g., x % of the physical buffer size). Benefits of this feedback signaling mechanism include that it avoids resource waste for applications/devices with limited storage without affecting their scheduling priorities, especially if the requested video is of high quality. It also enables techniques, such as rate boost with user trajectory prediction, which account for future deep down fades (by exceptionally filling up the playback buffer) for application/devices with surplus physical storage.

Figure 7A:
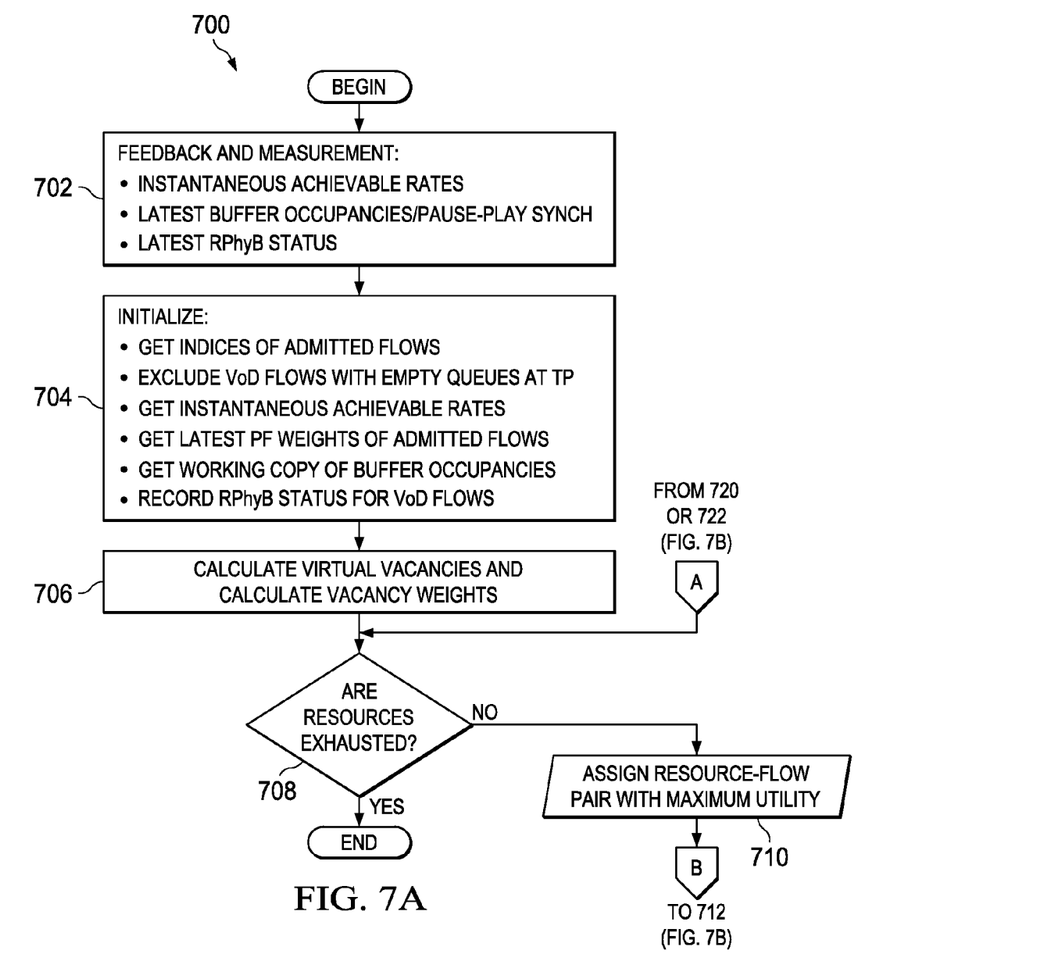
FIGS. 7A and 7B illustrate an embodiment method for scheduling VoD and best effort flows in a wireless network.
Figure 7B:
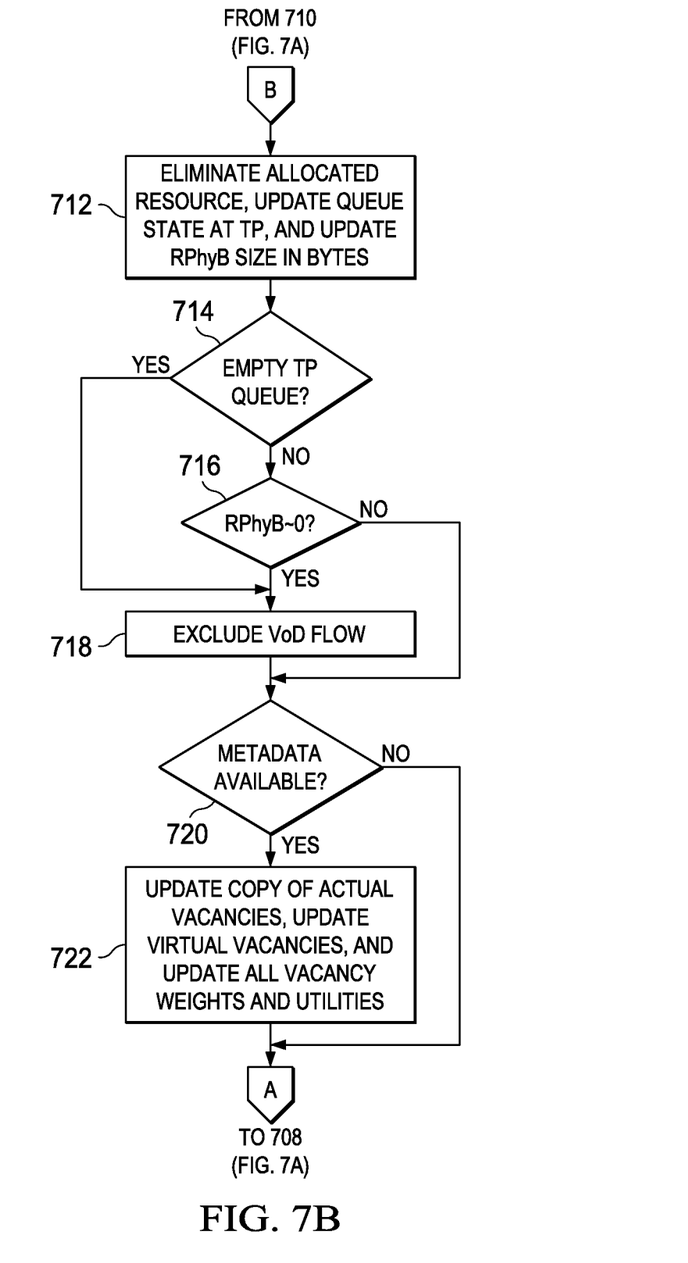

FIGS. 7A and 7B illustrate an embodiment method 700 for scheduling VoD and best effort flows in a wireless network. The method 700 is implemented at the TP at each scheduling instant. The method 700 begins at block 702 where the TP receives feedback and measurement from the UEs. The feedback includes the latest buffer occupancies, pause-play synch, and the latest RPhyB status. The measurement determines the instantaneous achievable rates for each wireless link (e.g., on each resource during the subject time slot). Next, at block 704, the TP initializes the flows. Initializing the flows includes getting indices of admitted flows, excluding VoD flows with empty queues at the TP, obtaining instantaneous achievable rates, obtaining the latest PF weights of admitted flows, obtaining working copies of the buffer occupancies for each flow, and recording the RPhyB status for VoD flows. At block 706, the TP calculates the virtual vacancies and calculates the vacancy weights. AT block 708, the TP determines whether resources are exhausted and, if yes, the process ends. If, at block 708, the resources are not exhausted, the method 700 proceeds to block 710 where the TP assigns resource-flow pair with maximum utility. At block 712, the TP eliminates allocated resources, updates the queue state at the TP, and updates the RPHyB size in bytes. At step 714, the TP determines whether the TP queue is empty. If, at step 714, the TP queue is empty, then the method 700 proceeds to block 718. If, at block 714, the TP is not empty, then the method proceeds to block 716 where the TP determines whether the RPhyB is approximately equal to zero. If, at block 716, the TP determines that the RPhyB is approximately zero, then the method proceeds to block 718. At block 718, the TP excludes VoD flow. If, at block 716, the TP determines that the RPhyB is not approximately zero, then the method 700 proceeds to block 720. At block 720, the TP determines whether meta data is available (i.e., side information that enables the TP to relate the amount of video data bits transmitted to the number of PTUs delivered). If, at block 720, the TP determines that meta data is not available, then the method returns to block 708. If, at block 720, the TP determines that meta data is available, then the method 700 proceeds to block 722 where the TP updates a copy of actual vacancies, updates virtual vacancies, and updates all vacancy weights and utilities, after which, the method 700 may return to block 708.

Figure 8:
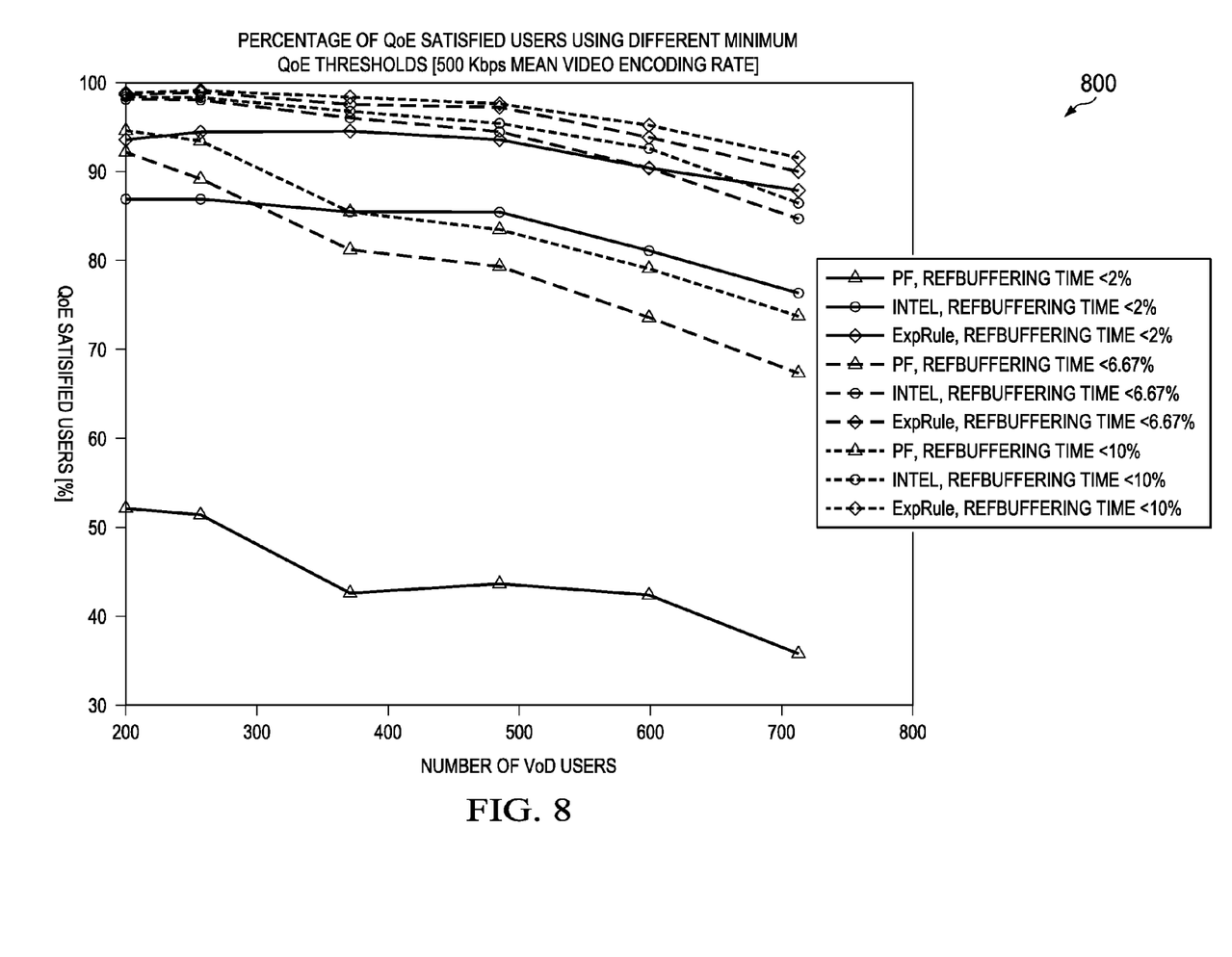
FIG. 8 illustrates a graph of simulated results for QoE versus the number of VoD users for different scheduling methods.

FIG. 8 illustrates a graph 800 of simulated results for QoE versus the number of VoD users for different scheduling methods. The environment and parameters for the simulation are:

57 cells, full transmission power
10 MHz, 5.4 MHz useful BW, 10 RBGs
100 msec TTI
Number of VoD UEs (flows) ranges from 57 to 713
Stored videos are fully available at the TP (video progressive download/playback without modeling traffic source feeding TP queues)
User request a stored video out of 54 videos encoded @ 500 Kbps mean rate
Flat fading channel
2.5 minute simulations and 15 second warm up buffer size
Client-based rate adaptation and physical buffer sizes (RPHyB) are not considered in this study
QoE unsatisfied users do not "give up" the video service (for user capacity/outage calculations)

The schemes or scheduling methods analyzed are a PFS baseline, Intel's buffer-aware (Utility=PF+Barrier function of buffer occupancy and threshold of 30 frames), and a vacuum pressure scheduling algorithm according to a disclosed embodiment [reference buffer size s=5 minutes]. As shown in graph 800, the percentage of QoE satisfied users for each of rebuffering times of <2%, <6.67, and <10% is greater using a disclosed vacuum pressure scheduling scheme than with the other schemes.

Figure 9:
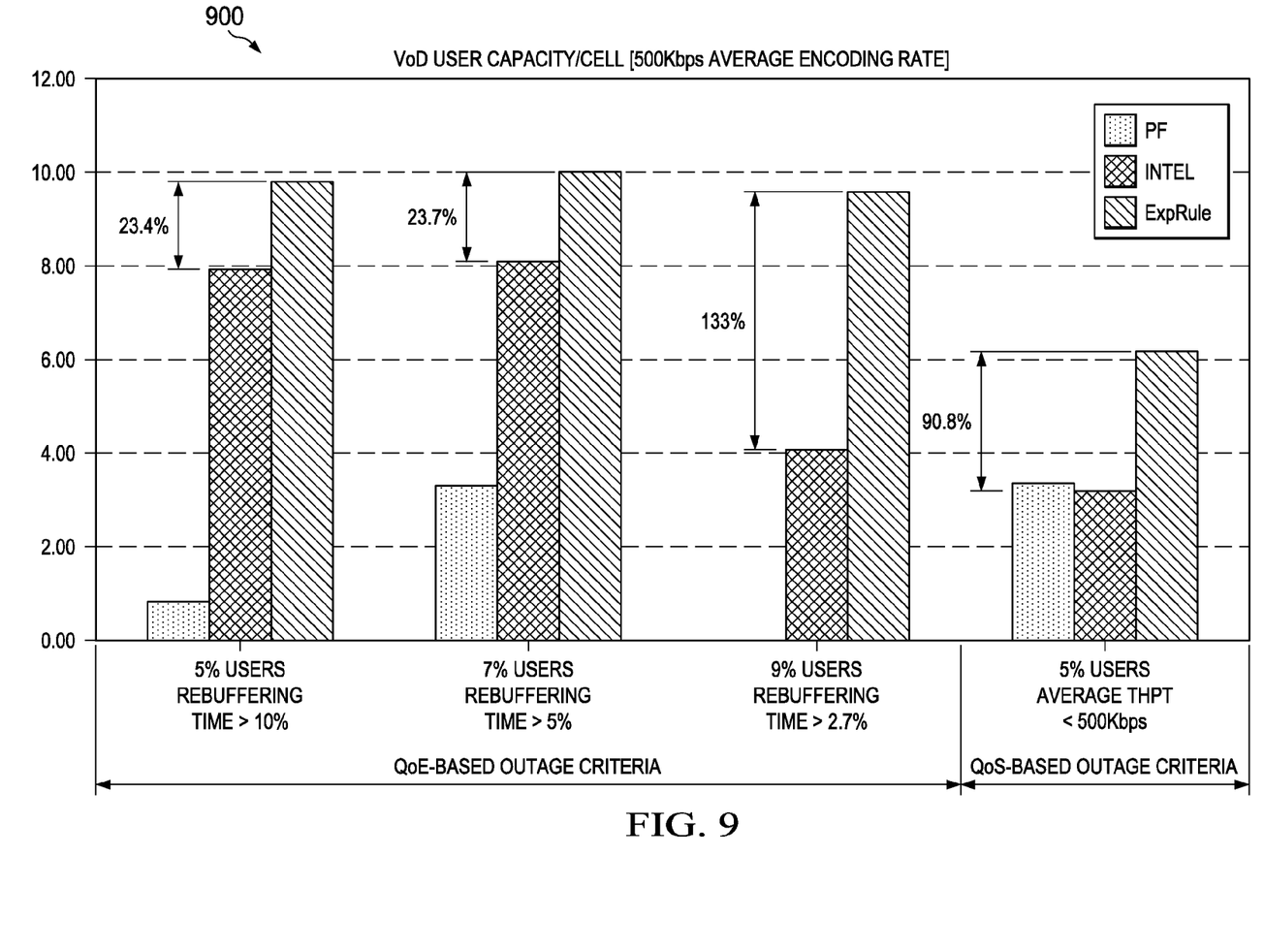
FIG. 9 is a graph illustrating VoD user capacity per cell for three different scheduling schemes at varying target maximum rebuffering time and target percentage of users experiencing less rebuffering time than the maximum.

FIG. 9 is a graph 900 illustrating VoD user capacity per cell for three different scheduling schemes at varying rebuffering times. The three different schemes that are compared are the PFS baseline, Intel's buffer-aware scheme, and a vacuum pressure scheduling algorithm according to a disclosed embodiment. As shown in graph 900, the VoD user capacity per cell is greater for the vacuum pressure scheduling algorithm according to a disclosed embodiment than for either of the other schemes.

Figure 10:
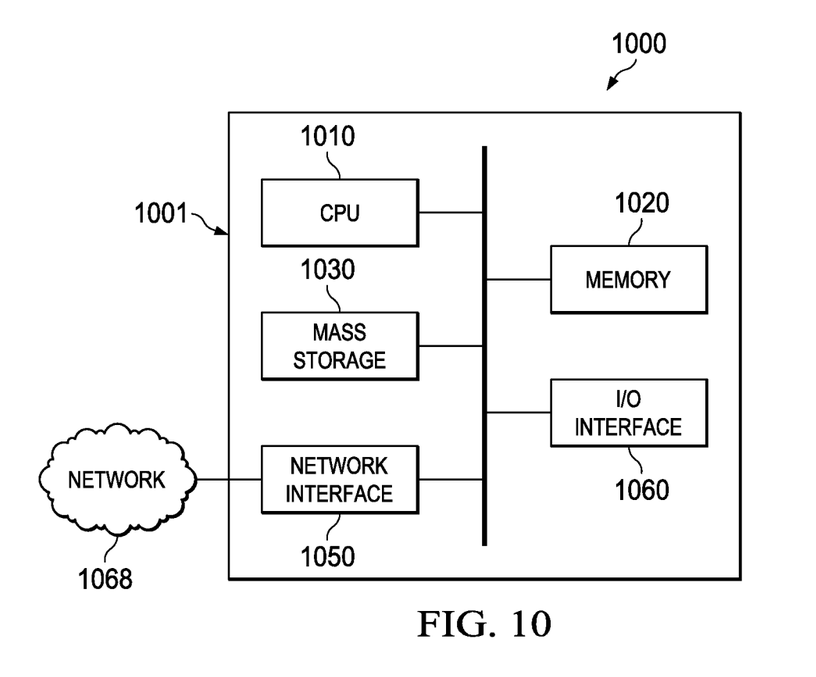
FIG. 10 is a processing system that can be used to implement various embodiments.

FIG. 10 is a block diagram of a processing system 1000 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as network interfaces, storage interfaces, and the like. The processing unit 1001 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for scheduling video on demand flows and best effort flows within a same band, the method comprising:
   determining with a transmission point (TP) a buffer vacancy for each of the ones of a plurality of mobile devices wirelessly coupled to a transmission point that are receiving video on demand (VoD) flows;
   calculating, with the TP, buffer vacancy scheduling weights for the plurality of mobile devices using the buffer vacancy; and
   determining, with the TP, a joint schedule of VoD flows and best effort flows based on the buffer vacancy scheduling weights; wherein determining the joint schedule comprises determining a vacuum pressure schedule comprising applying backpressure control policies to calculate vacancy weights at the mobile devices.

2. The method of claim 1 further comprising receiving feedback from at least one of the mobile devices, wherein the feedback comprises a playback buffer state and an indication of remaining physical memory from the mobile devices.

3. The method of claim 2, wherein the playback buffer state and the indication of remaining physical memory is received periodically from the mobile device.

4. The method of claim 2, wherein the feedback comprises one of a differential change in the remaining physical memory and an absolute indication of the remaining physical memory.

5. The method of claim 1, further comprising receiving event based feedback from one of the mobile devices when a remaining physical buffer size differs from a low level threshold by more than a specified value.

6. The method of claim 1 wherein the buffer vacancy is measured in playback time units (PTUs) with respect to a reference buffer size that is common for all video flows.

7. The method of claim 1 further comprising estimating the buffer vacancy for one of the mobile devices based on pause/play feedback from the one of the mobile devices.

8. The method of claim 1, further comprising allowing best effort flows to compete with VoD flows when the buffer vacancy for the ones of the plurality of mobile devices is in a safe vacancy range.

9. The method of claim 8, wherein the safe vacancy range is specified by an operator.

10. The method of claim 1 wherein the joint schedule does not sacrifice FSS gains and is performed without partitioning radio resources.

11. The method of claim 1, wherein the joint schedule comprises a soft schedule wherein buffer vacancy weights gradually decrease as the buffer vacancy decreases such that a utility that is less than or equal to a proportional fairness (PF) utility is rendered within a safe vacancy region.

12. A network component configured for scheduling video on demand flows and best effort flows within a same band comprising:
a processor; and
a non-transitory computer readable storage medium storing programming for execution by the processor, the programming including instructions to:
determine a buffer vacancy for each of the ones of a plurality of mobile devices wirelessly coupled to a transmission point that are receiving video on demand (VoD) flows;
calculate vacuum pressure scheduling weights for the plurality of mobile devices using the buffer vacancy; and
determine a joint schedule of VoD flows and best effort flows based on the vacuum pressure scheduling weights; wherein the instructions to determine the joint schedule comprises instructions to determine a vacuum pressure schedule by applying backpressure control policies to calculate vacancy weights at the mobile devices.

13. The network component of claim 12 further comprising instructions to receive feedback from at least one of the mobile devices, wherein the feedback comprises a playback buffer state and an indication of remaining physical memory from the mobile devices.

14. The network component of claim 13, wherein the playback buffer state and the indication of remaining physical memory is received periodically from the mobile device.

15. The network component of claim 13, wherein the feedback comprises one of a differential change in the remaining physical memory and an absolute indication of the remaining physical memory.

16. The network component of claim 12, further comprising instructions to receive event based feedback from one of the mobile devices when a remaining physical buffer size differs from a low level threshold by more than a specified value.

17. The network component of claim 12 wherein the buffer vacancy is measured in playback time units (PTUs) with respect to a common reference buffer size.

18. The network component of claim 12 further comprising instructions to estimate the buffer vacancy for one of the mobile devices based on pause/play feedback from the one of the mobile devices.

19. The network component of claim 12, further comprising instructions to allow best effort flows to compete with VoD flows when the buffer vacancy for the ones of the plurality of mobile devices is in a safe vacancy range.

20. The network component of claim 19, wherein the safe vacancy range is specified by an operator.

21. The network component of claim 12 wherein the joint schedule is performed without partitioning.

22. The network component of claim 12, wherein the joint schedule comprises a soft schedule wherein buffer vacancy weights gradually decrease as the buffer vacancy decreases such that a utility that is less than or equal to a proportional fairness (PF) utility is rendered within a safe vacancy region.

23. A method for scheduling video on demand (VoD) flows and best effort flows within a same band, the method comprising:
determining, with a transmission point (TP), buffer vacancies for user equipment (UE) receiving VoD flows;
obtaining, with the TP, a safe vacancy value range; and
determining, with the TP, a joint schedule of VoD flows and best effort flows based on a vacuum pressure scheduling algorithm using the buffer vacancies, wherein best effort flows are allowed to compete with VoD flows when the buffer vacancies for the UEs receiving VoD flows are within the safe vacancy value range; wherein the vacuum pressure scheduling algorithm comprises a modified backpressure algorithm with scheduling weights based on buffer vacancies.

24. The method of claim 23, further comprising receiving feedback from the UEs and adjusting the joint schedule based on the feedback.

25. The method of claim 24, wherein the feedback is received periodically.

26. The method of claim 24, wherein the feedback is event-based.

27. The method of claim 26, wherein the event comprises a remaining buffer differs from a low level threshold by more than a specified value.

28. The method of claim 26, wherein the feedback comprises a value for a remaining buffer size for one of the UEs.

29. The method of claim 26, wherein the feedback comprises a differential change in a remaining buffer size for one of the UEs.

30. The method of claim 23, wherein the TP estimates buffer states for the UEs based on pause and playback feedback from at least some of the UEs.

31. The method of claim 23, wherein the safe vacancy value range is adjustable by an operator.

* * * * *